(12) United States Patent
Fraas et al.

(10) Patent No.: US 11,959,509 B2
(45) Date of Patent: Apr. 16, 2024

(54) HOUSING

(71) Applicant: Mahle International GmbH, Stuttgart (DE)

(72) Inventors: Marc Fraas, Bietgheim-Bissingen (DE); Michael Komowski, Weil Der Stadt (DE); Holger Laux, Dietingen (DE)

(73) Assignee: Mahle International GmbH (DE)

( * ) Notice: Subject to any disclaimer, the term of this patent is extended or adjusted under 35 U.S.C. 154(b) by 245 days.

(21) Appl. No.: 17/369,880

(22) Filed: Jul. 7, 2021

(65) Prior Publication Data
US 2022/0042533 A1    Feb. 10, 2022

(30) Foreign Application Priority Data

Jul. 8, 2020    (DE) .................. 102020208560.9

(51) Int. Cl.
*F16B 5/06*    (2006.01)

(52) U.S. Cl.
CPC .................. *F16B 5/0664* (2013.01)

(58) Field of Classification Search
CPC ...... F16B 5/0664; F16B 5/0016; F16B 17/00; F16B 5/06
USPC ....................................................... 403/382
See application file for complete search history.

(56) References Cited

U.S. PATENT DOCUMENTS

| | | | |
|---|---|---|---|
| 4,466,754 A * | 8/1984 | Poitier | F16B 5/0607 403/11 |
| 4,844,645 A | 7/1989 | Rasmussen | |
| 6,049,963 A | 4/2000 | Boe | |
| 2006/0001276 A1 | 1/2006 | Vitry | |
| 2011/0017742 A1 | 1/2011 | Sausen | |
| 2012/0002352 A1 | 1/2012 | Hsiung | |
| 2014/0263865 A1 | 9/2014 | Salian | |
| 2015/0061475 A1 | 3/2015 | Fairchild | |
| 2019/0359027 A1 | 11/2019 | Weber | |

FOREIGN PATENT DOCUMENTS

| | | |
|---|---|---|
| CN | 1035552 A | 9/1989 |
| CN | 101068996 A | 11/2007 |
| CN | 102316684 A | 1/2012 |
| CN | 102469850 A | 5/2012 |
| CN | 105594310 A | 5/2016 |
| CN | 108055794 A | 5/2018 |
| DE | 199 29 062 A1 | 1/2001 |
| DE | 10 2005 046 828 A1 | 4/2006 |

(Continued)

OTHER PUBLICATIONS

English abstract for DE-199 29 062.

(Continued)

*Primary Examiner* — Lindsay M Low
*Assistant Examiner* — Omar Morales
(74) *Attorney, Agent, or Firm* — Fishman Stewart PLLC (57) ABSTRACT

A housing may include a first housing part and a second housing part. The first housing part may include a first latching contour having at least one first latching lug. The first housing part may include at least one further latching contour having at least one further latching lug. The second housing part may be connected to the first housing part via a latching connection. The second housing part may include at least one counter-latching contour.

20 Claims, 5 Drawing Sheets

(56)  References Cited

FOREIGN PATENT DOCUMENTS

| | | |
|---|---|---|
| DE | 10 2006 016 483 A1 | 7/2007 |
| DE | 10 2007 012 519 A1 | 9/2008 |
| DE | 10 2009 037 304 A1 | 2/2011 |
| DE | 20 2017 100 199 U1 | 3/2017 |
| FR | 2 875 868 A1 | 3/2006 |

OTHER PUBLICATIONS

English abstract for DE-10 2005 046 828.
English abstract for DE-102006016483.
English abstract for DE-10 2007 012 519.
English abstract for FR-2 875 868.
English abstract for DE-10 2009 037 304.
Chinese Search Report dated Nov. 16, 2022 for copending Chinese App. No. 202110767248.0 (w_Eng_transl.).
Chinese Office Action dated Nov. 24, 2022 for copending Chinese App. No. 202110767248.0 (w_Eng_transl.).

\* cited by examiner

HOUSING

CROSS-REFERENCE TO RELATED APPLICATION

This application claims priority to German Application No. DE 10 2020 208 560.9 filed on Jul. 8, 2020, the contents of which are hereby incorporated by reference in its entirety.

TECHNICAL FIELD

The present invention relates to a housing having a first housing part and a second housing part connected therewith via a latching connection according to the preamble of claim 1.

BACKGROUND

From DE 10 2005 046 828 A1 an air guide housing for ventilation, heating or air conditioning systems in a motor vehicle with openings for mounting connecting parts is known. There, two housing parts are connected to one another by way of three hook-shaped regions.

From DE 10 2007 012 519 A1 a generic housing having two housing parts is known, which are positively connected to one another by way of a tongue and groove joint. In at least one region, the tongue comprises a latching lug which engages in a recess provided in the groove. The two housing parts are thus also connected to one another, i.e. latched to one another via a latching connection.

From DE 10 2009 037 304 A1 a generic housing having two housing parts that are interconnected to one another via a latching connection is again known, wherein in the region of a connection of the two housing parts a so-called tongue and groove joint is provided. The one housing part comprises a first groove having a first and second groove wall, while the other housing part has an associated tongue.

From DE 199 29 062 A1 a filter arrangement for a ventilation system of a motor vehicle is known, having a filter housing, which comprises a filter introduction opening and a surrounding contact edge arranged spaced apart from the filter introduction opening. Here, an air filter comprises a filter body and a filter frame enclosing the same on the edge side, which with its one front face lies against the contact edge and, by means of latching means, is axially immovably clamped to the contact edge. Between the contact edge of the filter housing and the front face of the filter frame a tongue and groove joint is provided.

In the case of housings having at least two housing parts there is generally a connecting joint between the two housing parts, which depending on the application of the housing should be closed in a gap-free and thus leak-proof or at least low-leakage manner. When using favourable clip-on connections, the minimising of gaps and thus also a minimising of leakages are realisable only conditionally. Manufacturing tolerances of plastic parts, which can likewise result in gaps and thus leakages, cannot be offset by means of known, favourable clip-on connections either. Added to this are also a high degree of customising expenditure and thus higher costs in the injection moulding tool, since the clip on the one hand has to preferably sit soundly and on the other hand has to be loose enough in order to be securely clipped on despite manufacturing fluctuations. Merely by means of latching connections similar to cable ties with very fine latching lugs would it be possible to offset manufacturing tolerances in the parts manufacture and minimise leakages or gaps developing through this. The individual latching lugs on latching connections in the case of cable ties, however, cannot be transferred to latching connections on housing parts, since the latching lugs, due to the tooling, cannot be embodied finely (small) enough for the tolerance compensation and thus a tightness can only be realised by bridging the connection, i.e. a clipping together of the two housing parts under tension. With a clip-on connection similar to a cable tie the clip would have to be bridged by approximately 1 mm, as a result of which the clip would require a kind of pressure clamp. With increasing duration and/or under the influence of temperature, the tension built up during over-pressing can decrease (the pressure clamp thus becomes quasi softer). For this reason, a tight connection cannot be ensured over the runtime of the air-conditioning system.

SUMMARY

The present invention therefore deals with the problem of stating an improved or at least an alternative embodiment for a housing of the generic type, which in particular overcomes the disadvantages known from the prior part.

According to the invention, this problem is solved through the subject of the independent claim 1. Advantageous embodiments are subject of the dependent claims.

The present invention is based on the general idea of offsetting manufacturing tolerances of housing parts in that latching lugs arranged next to one another and additionally offset relative to one another in the latching direction are provided, as a result of which a very finely matched latching connection that can be closed in small steps (latching stages) can be created, which is additionally arranged in the region of a separating joint between two housing parts and because of its finely stepped nature makes possible a tight connection of the two housing parts without after-pressure on the clip-on point or the latching connection. "Next to one another in latching direction" is to signify "arranged along the separating joint next to one another", i.e. transversely to the actual latching direction. Here, the housing according to the invention has a first housing part and a second housing part connected therewith via the latching connection.

According to the invention, a first latching contour with at least one first latching lug and at least one further latching contour with at least one further latching lug and on the second housing part at least one counter-latching contour are provided respectively.

The at least one first latching lug is arranged in the latching direction, i.e. in the closing direction of the latching connection, spaced apart from the at least one further latching lug on the further latching contour, wherein the counter-latching contour in the latched state is latched to the first latching lug or to the at least one further latching lug and the two housing parts are held together because of this. Through the arrangement of the individual latching lugs offset in the latching direction with at least two latching contours arranged next to one another transversely to the latching direction, extremely small clipping steps can be created which, in a single latching contour, would not be possible in this way with, due to the tooling with latching lugs arranged one behind the other in the latching direction. With the latching connection according to the invention, it is additionally possible to latch the two housing parts to one another, free of pressure via the latching connection so that for example dimensional tolerances due to the manufacture can be offset and gaps occurring between the first and second housing parts at least minimised. With the latching connection according to the invention it is possible, furthermore, to make possible a latching or connecting of the two housing parts free of tension. The first and the at least one further latching contour each with preferentially multiple latching lugs arranged in the latching direction one after the other are arranged in the latching direction next to one another and slightly offset in the latching direction with respect to the latching lugs, as a result of which upon a latching of the latching connection, the counter-latching contour alternately latches to the first and the further latching lugs. In particular it is thereby possible to significantly reduce the size of the latching steps. Here it is obviously conceivable that besides the first and second further latching contour even further latching contours can be employed in order to make possible a further or finer sub-division of the individual latching steps.

In a further advantageous embodiment of the solution according to the invention, the counter-latching contour is formed as a continuous lip, strip or tongue. The counter-latching contour, when closing the latching connection, sweeps over the first and, depending on the degree of latching, the at least one further latching contour if applicable and thereby makes possible a finely stepped latching. The first latching contour can also be arranged in the latching direction merely partially overlapping with the at least one further latching contour.

In an advantageous further development of the solution according to the invention, the at least one first latching lug in the latching direction has a distance b of 0.10 mm≤b≤0.50 mm, preferably a distance b of 0.10 mm≤b≤0.30 mm, in particular of b approximately 0.20 mm from the at least one further latching lug. By way of this it is possible to create a step of 0.2 mm, as a result of which an extremely small-stepped latching connection with latching lugs or latching teeth that are nevertheless comparatively large and easily produced is possible.

In a further advantageous embodiment of the solution according to the invention, a second further latching contour with at least one second further latching lug is provided on the first housing part, wherein the first latching contour, a first further latching contour and second further latching contour are arranged step-like. By way of this, a cascade-like or step-like latching contour can be created, wherein it is conceivable that the individual latching contours are offset relative to an adjacent latching contour to a different degree in the latching direction so that, for example, a distance b of a first latching lug of the first latching contour in the latching direction is shifted by 0.2 mm to the at least one first further latching lug of the first further latching contour, while the first further latching lug is shifted by a distance b of, for example, 0.15 mm to a second further latching lug of the second further latching contour in the latching direction. By way of this, fineness or sizes of the latching steps that increase or decrease can also be adjusted in the latching direction.

Practically, a second further latching contour with at least one second further latching lug and two first further latching contours each having at least one first further latching lug and two first latching contours each having at least one first latching lug are provided on the first housing part. The second further latching contour is arranged between the two first further latching contours and the two first further latching contours are arranged between the two first latching contours, wherein the first latching contours are arranged in the latching direction in front of the two first further latching contours and the two first further latching contours in the latching direction in front of the second further latching contour. Here, the latching contours can be arranged in such a manner that the counter-latching contour when closing the latching connection initially interacts with the first latching contours, following this with the first further latching contour, again following this only with the second further latching contour. When closing the latching connection, the counter-latching contour thus enters into contact initially with the first latching contour, then with the first further and, if applicable, additionally with the second further latching contour.

In a further advantageous embodiment of the solution according to the invention at least the first latching contour is formed integrally with the first housing part, in particular as a single plastic injection moulding. In the same way, the further latching contours can obviously also be formed integrally with the first housing part, as a result of which a cost-effective and high-quality manufacture of the first housing part and of the latching contours or latching lugs arranged thereon is possible at the same time.

Practically, a groove and an associated tongue can be arranged on the second housing part and on the first housing part respectively, or vice versa. By way of such a tongue and groove connection, a type of labyrinth seal can be created, which makes it possible even without additionally inserted sealing means, to create a connection between the two housing parts that is almost gap-free and approximately fluid-tight.

In a further advantageous embodiment of the solution according to the invention, a pressure clamp is arranged on the first housing part on the free end of which the latching contours are arranged. By means of such a pressure clamp it is possible for closing the latching connection to exert pressure on the latching contours and thereby also establish a tensioned latching connection. By means of such a tensioned latching connection, in particular, temperature-induced strains which under certain conditions could result in gaps in a connecting plane between the first and the second housing part can be prevented.

In a further advantageous embodiment of the solution according to the invention, a through-opening is arranged on the second housing part, wherein the counter-latching contour protrudes into the through-opening and the first housing part with a latching contour is introduced into the through-opening. By way of this, an unintentional undoing of the latching connection can be rendered more difficult since the through-opening forms a frame about the latching connection and thereby prevents an opening through unintentional touching or because of forces, for example, vibration developing during the operation.

Further important features and advantages of the invention are obtained from the sub-claims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

According to FIGS. 1 to 11, a housing 1 according to the invention comprises a first housing part 2 and a second housing part 4 that is connected to the same via a latching connection 3. According to the invention, a first latching contour 5 with at least one first latching lug 6 and at least one further latching contour 7, 12 with at least one further latching lug 8, 11 is arranged on the first housing part 2. On the second housing part 4, by contrast, at least one counter-latching contour 9 is provided, which can be designed, for example, as continuous strip, lip or tongue. For producing an extremely finely stepped latching connection 3 at least one first latching lug 6 spaced apart in the latching direction 10 relative to the at least one further latching lug 8, 11 is now arranged, for example, by a predefined distance b. The counter-latching contour 9 in the latched state is latched to the at least one first latching lug 6 or to the at least one further latching lug 8, 11, as a result of which the two housing parts 2, 4 are securely connected to one another. Through the spaced-apart arrangement of at least the first latching lug 6 and a further latching lug 8, 11, gaps and thus leakage openings in the connecting region of the first housing part 2 and of the second housing part 4 can be reliably at least minimised. A similar latching connection is possible, for example, with so-called cable ties, wherein such fine latching teeth with housing parts 2, 4 are not possible due to the tooling.

With the finely stepped latching connection 3 according to the invention it is additionally possible to avoid over-tensioned latching connections, which would be necessary for tolerance offset, for example, with latching connections having merely a single latching lug. In particular, a comparatively simple offsetting of manufacturing-related dimensional tolerances in the region of the first housing part 2 or the second housing part 4 can also be achieved with the latching connection 3 according to the invention. With the latching connection 3 according to the invention, a simplified and cost-effective mounting, in particular compared with a screw connection, can also be achieved.

Figure 1:
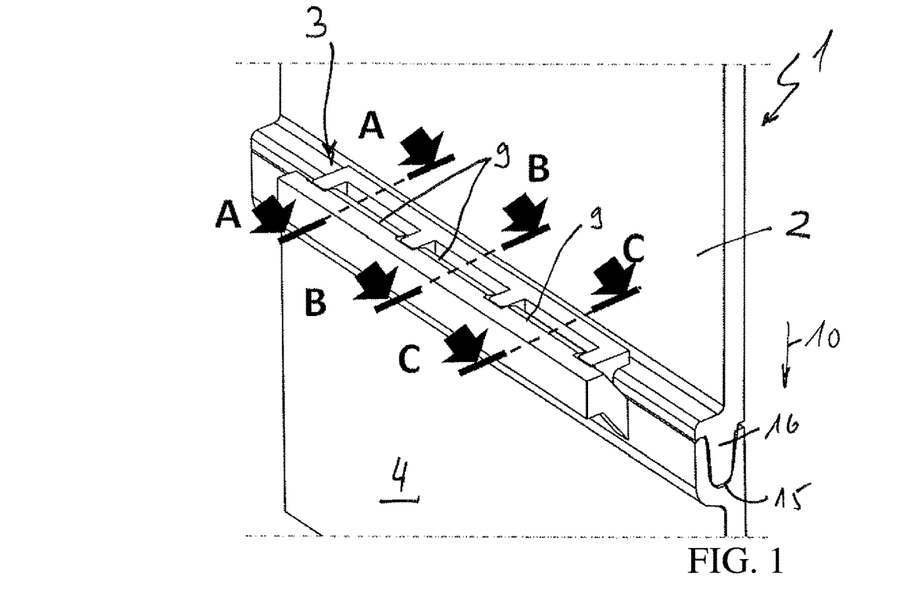
FIG. 1 a view of a possible embodiment of a housing according to the invention.
Figure 2A:
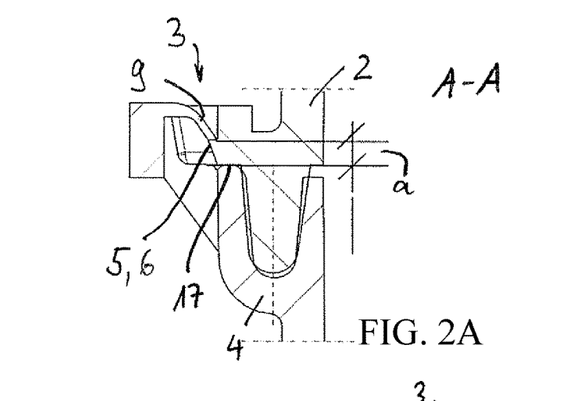
FIG. 2a a sectional representation through the latching connection on the housing according to FIG. 1 along the section plane A-A, FIG. 2b a representation as in FIG. 2a, however, along the section plane B-B, FIG. 2c a representation as in FIG. 2a, however, along the section plane C-C, FIG. 3 a view of a second housing part with a counter-latching contour and a detailed representation therefrom, FIG. 4 a view of the latching connection shown according to FIG. 1 with latched counter-latching contour, FIG. 5 a representation as in FIG. 4, however, with counter-latching contour not latched as yet, FIG. 6 a housing according to the invention with a latching connection having a pressure clamp, FIG. 7 a detailed representation of the second housing part with through-opening and counter-latching contour, FIG. 8 a detailed representation of the first housing part with pressure clamp and altogether three different latching contours, FIG. 9a a sectional representation through an opened latching connection according to FIGS. 6 to 8, FIG. 9b a representation as in FIG. 9a, however, with closed latching connection, FIG. 10 a closed latching connection analogous to FIG. 6 with latched counter-latching contour in a sectional representation, FIG. 11 a representation as in FIG. 10, however, with counter-latching contour not latched as yet.
Figure 2B:
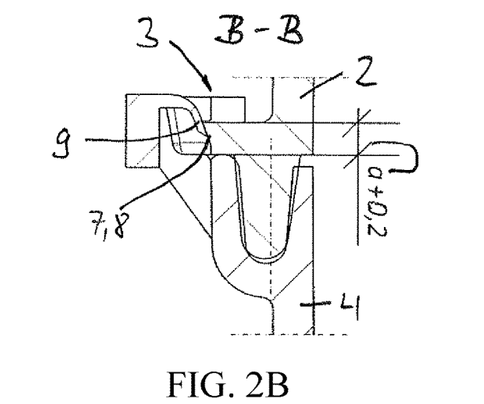
Figure 2C:
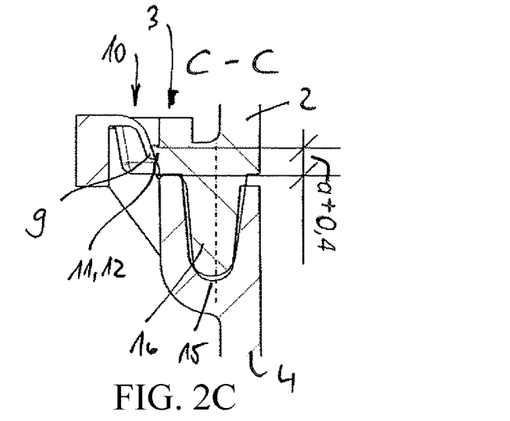
Figure 3:
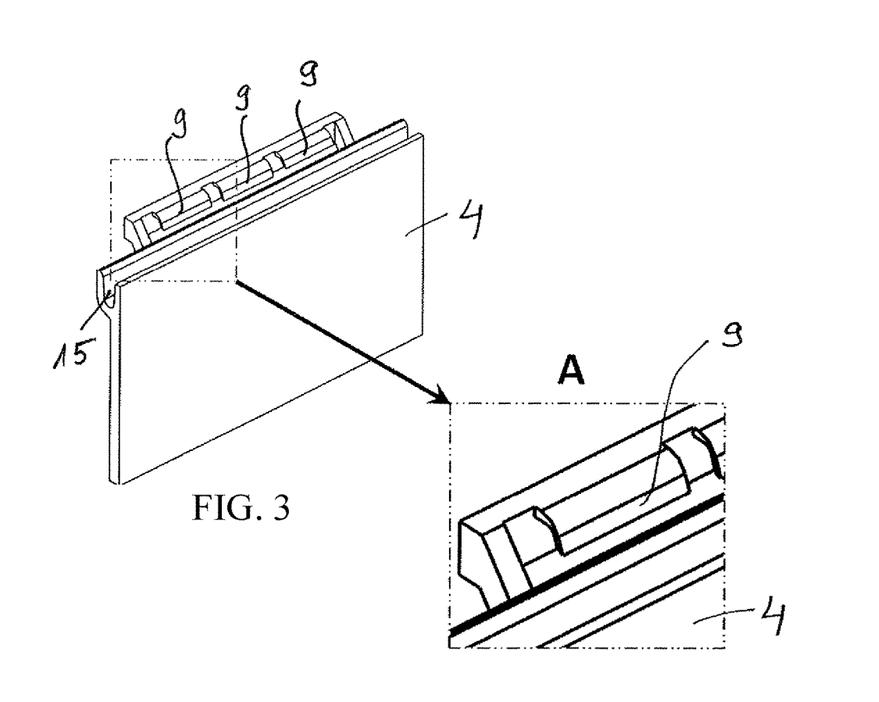
Figure 4:
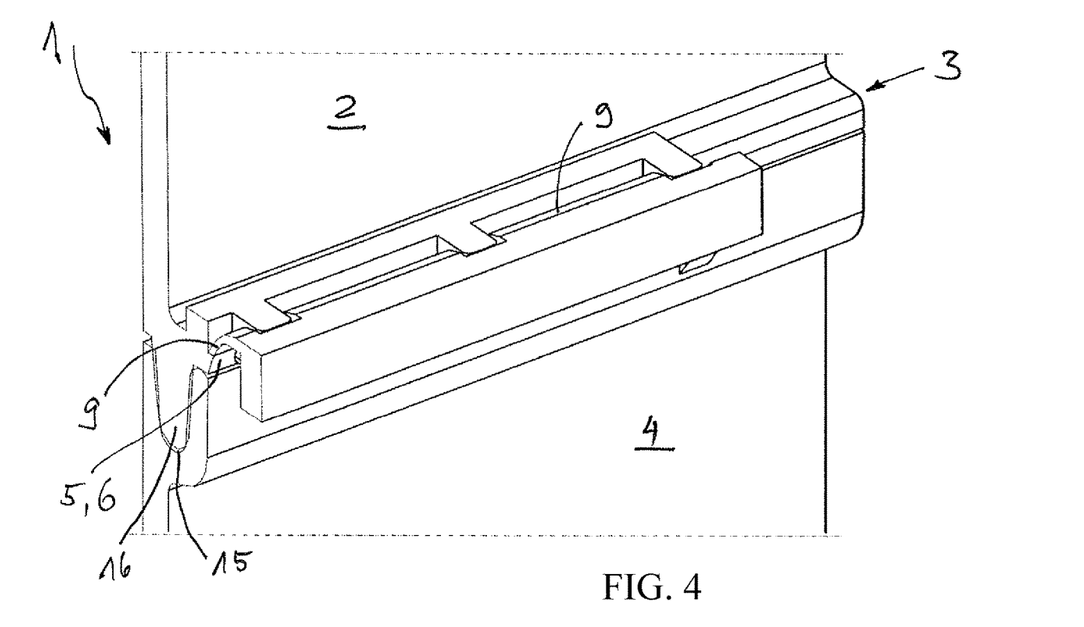
Figure 5:
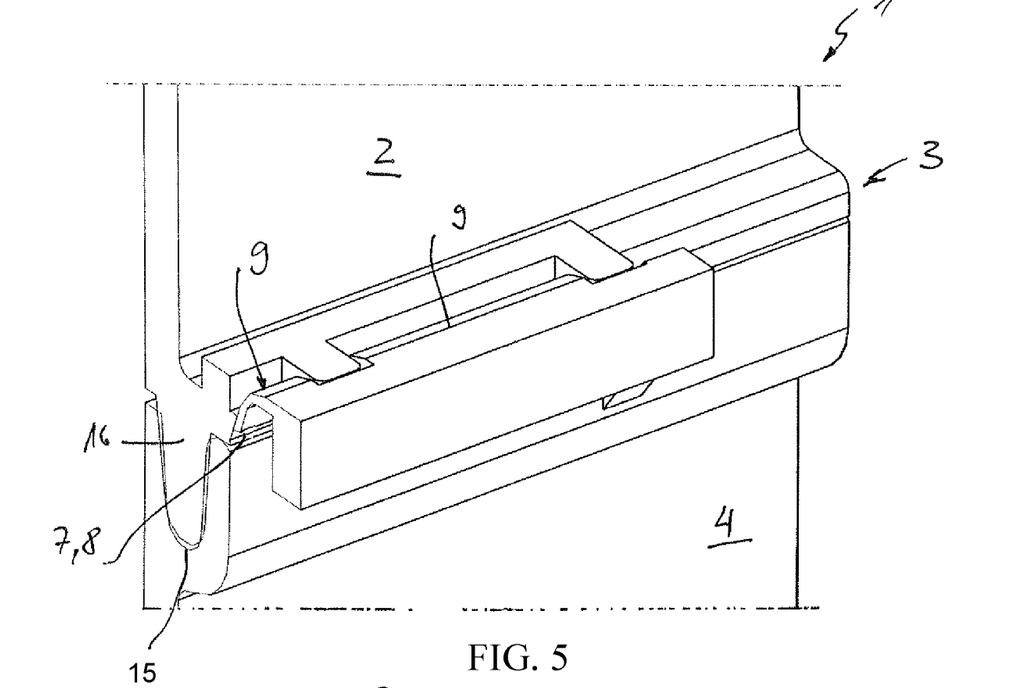
Figure 6:
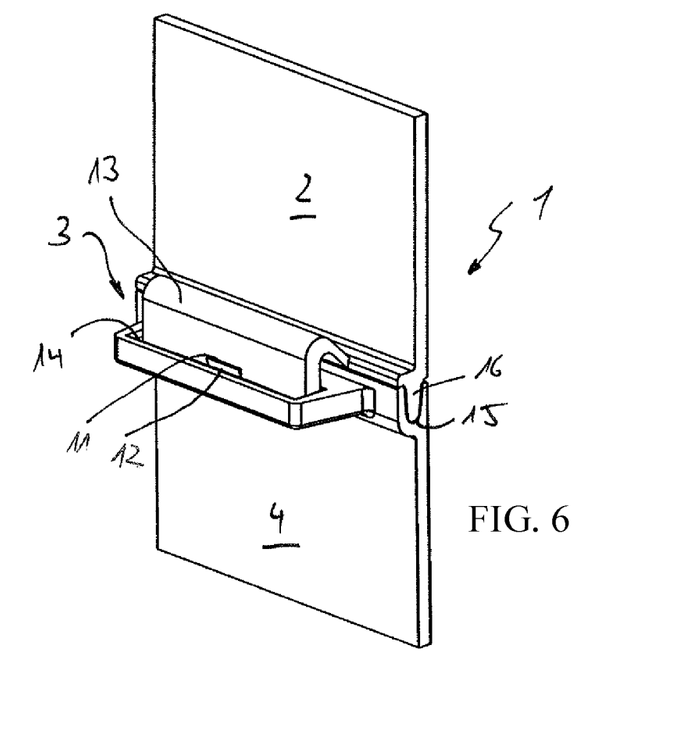
Figure 7:
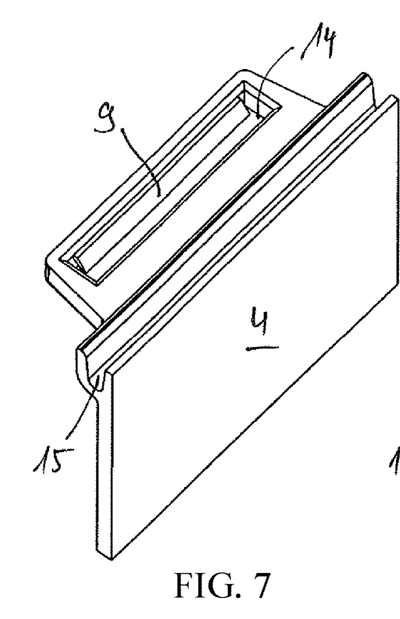

Here, the at least one first latching lug 6 can have any distance a to a step 17 in latching direction 10, which simultaneously corresponds to the mounting direction see FIG. 2a). The distance drawn in FIG. 2b preferentially amounts to a+0.2 mm, while the distance drawn in FIG. 2b amounts to preferentially a+0.4 mm.

The further latching contours 7, 12 can be divided into a first further latching contour 7 having at least one first further latching lug 8 and a second further latching contour 12 having at least one second further latching lug 11. When, for example, a second further latching contour 12 with a second further latching lug 11 is additionally provided, a distance b of 0.4 mm can be provided between the first latching lug 6 and the second further latching lug 11 as a result of which the latching step height is 0.2 mm and because of this an extremely finely stepped latching connection 3 is made possible (see FIGS. 2a to 2c, 9a).

The counter-latching contour 9 on the second housing part 4 is preferentially formed as a continuous lip or strip and thereby sweeps over the individual latching lugs 6, 8, 11 in succession during the closing of the latching connection 3 according to the invention, which means as a function of the compression of the latching connection 3.

However, the counter-latching contour 9 on the second housing part 4 can also be formed of individual lips.

With the latching connections 3 according to FIGS. 6 to 11, a pressure clamp 13 is arranged on the first housing part 2, on the free end of which the individual latching contours 5, 7, 12 with the respective latching lugs 6, 8, 11 are arranged. With such a pressure clamp 13 it is possible to preload the latching connection 3 by pressing and because of this achieve not only a latching of the counter-latching contour 9 to the first latching lug 6, but for example, also to the first further latching lug 8 arranged offset to the same in the latching direction 10 or the second further latching lug 11. Here, tolerances as a function of the geometries shown in FIG. 1-5 can obviously be taken into account. Typically, one would design a geometry so that in the design state the first further latching lug 8 engages, and then depending on dimensional deviation the first latching lug 6 or the second further latching lug 11 or any further ones. During over-pressing in turn the first latching lug 6 in the design case would already engage but one would continue over-pressing further or in the case of oversize one would have to over-press in order to be able to latch to the first latching lug 6 in the first place.

In the version of the latching connection 3 with the pressure clamp 13, a through-opening 14 (see FIG. 6, 7 as well as 9 to 11) is arranged on the second housing part 4, wherein the counter-latching contour 9 protrudes into the through-opening 14 and the first housing part 2 with its latching contours 5, 7 and if applicable 12, likewise engages in the through-opening 14.

Generally, only a single latching contour 6, 8, 11 each can be arranged on the first latching contour 5, just as on the first further latching contour 7 or the second further latching contour 12, or two or more latching lugs 6, 8, 11 can also be provided for each latching contour 5, 7, 12.

Figure 8:
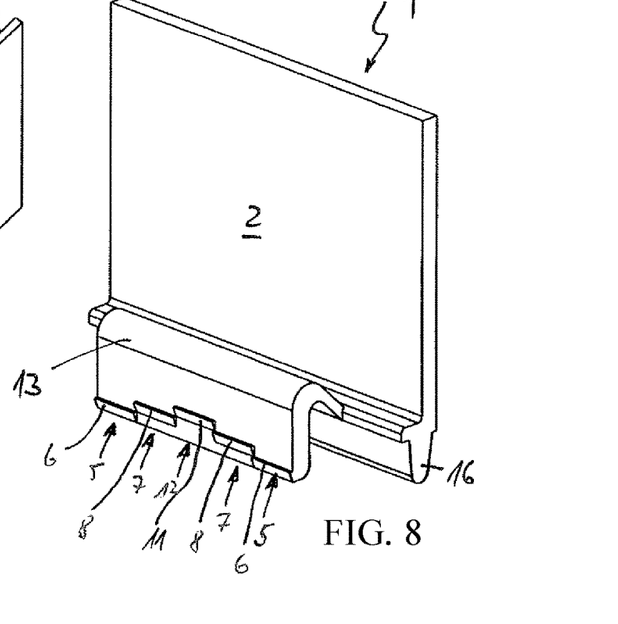
Figure 9A:
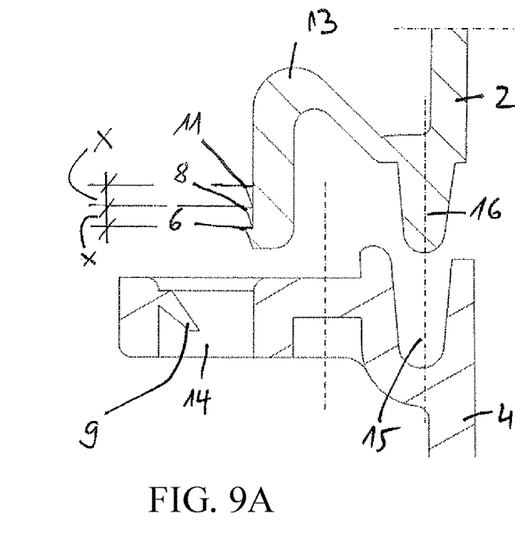
Figure 9B:
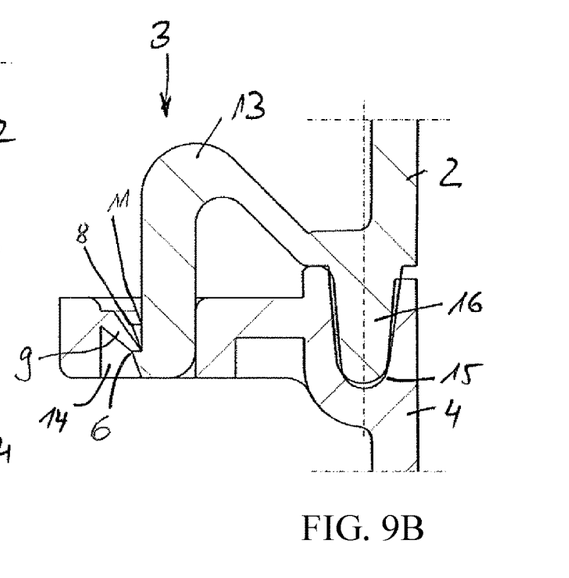
Figure 10:
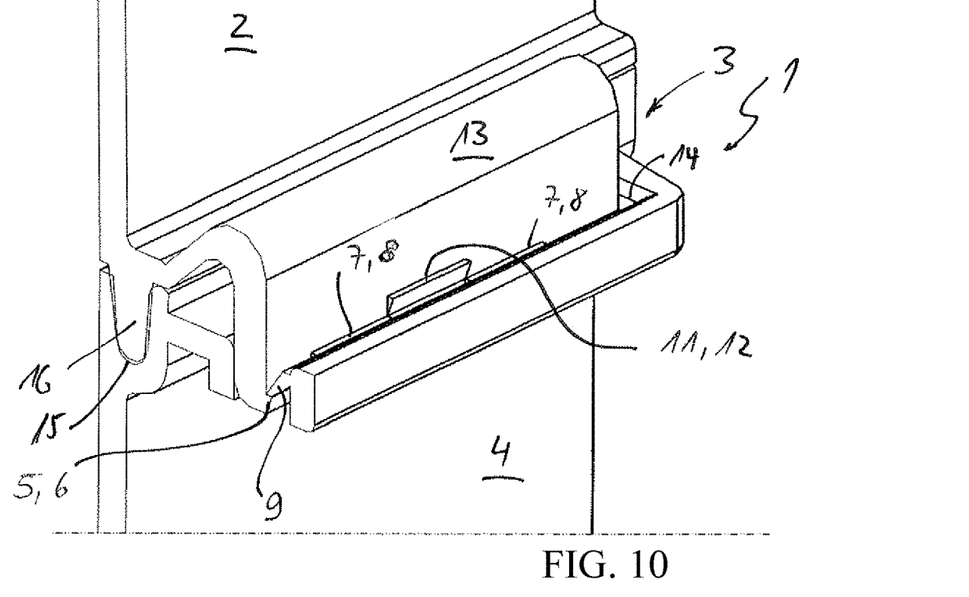
Figure 11:
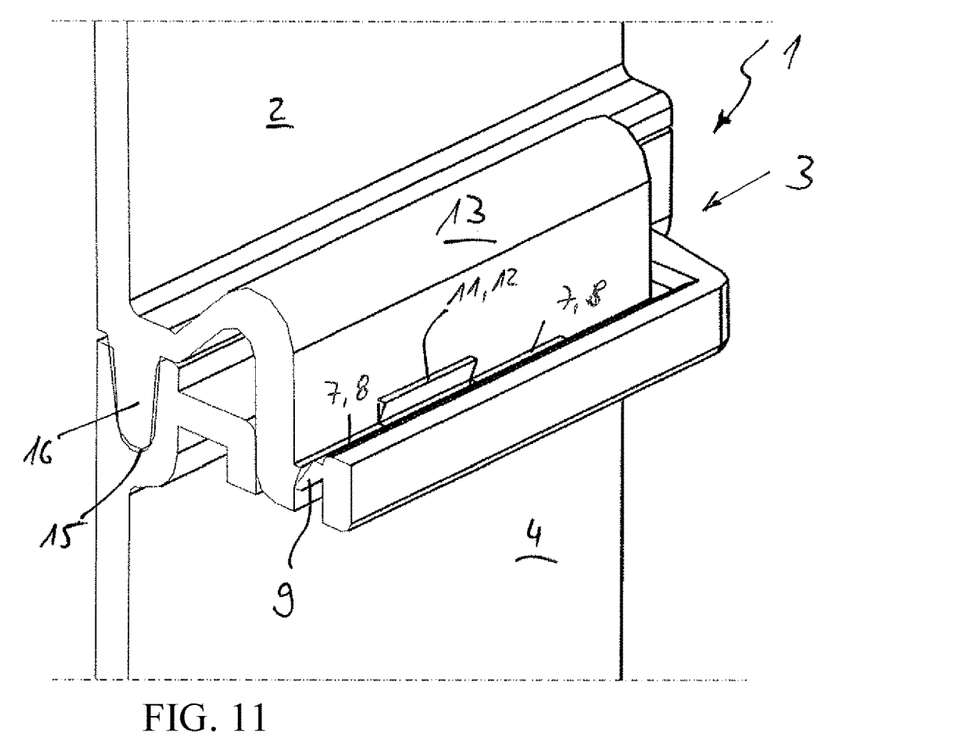

Looking at the embodiment of the latching connection 3 shown according to FIG. 8, or the latching contours 5, 7 and 12 shown there, it is noticeable that on the first housing part 2 a second further latching contour 12 having a second further latching lug 11 and two first further latching contours 7 each having at least one first further latching lug 8 and two first latching contours 5 each with a first latching lug 6 are provided. The second further latching contour 12 is arranged between the two first further latching contours 7 and the two first further latching contours 7 between the two first latching contours 5, wherein the first latching contours 5 are arranged in the latching direction 10 in front of the two first further latching contours 7 and the two first further latching contours 7 in the latching direction 10 in front of the second further latching contour 12. This produces a pedestal-like or step-like profile of the individual latching contours 5, 7 and 12. On closing the latching connection 3, the counter-latching contour 9 thus latches initially to the first latching contours 5 arranged on the edge side, then upon a further closing of the latching connection 3, to the two first further latching lugs 8 of the first further latching contours 7 and, if applicable, with a further compressing of the latching connection 3, to the second further latching lug 11 of the second further latching contour 12.

The at least one first latching contour 5 is preferentially formed integrally with the first housing part 2, in particular as integral plastic injection mounding, as a result of which a comparatively simple and cost-effective manufacture both of the first housing part 2 and also of the first latching contour 5 is possible. In the same way, the counter-latching contour 9 can obviously be also designed integrally with the second housing part 4, here for example also as a single plastic injection moulding.

Practically, a groove 15 and an associated tongue 16 are arranged on the second housing part 4 and on the first housing part 2 respectively or vice versa. By way of such a tongue and groove connection it is possible to create a type of labyrinth seal between the first housing part 2 and the second housing part 4, as a result of which a low-leakage connection can be created. All in all, a type of cable tie-like latching connection 3 can be created with the latching connection 3 according to the invention, which makes possible an extremely finely stepped latching over multiple latching steps, namely, at least of the first latching contour 5 and, if applicable, of the further latching contours 7, as a result of which an offsetting of manufacturing tolerances and thus also as tightly as possible a connecting of the two housing parts 2, 4 is achieved.

The invention claimed is:

1. A housing, comprising:
    a first housing part including a first latching contour having at least one first latching lug, a first further latching contour having a first further latching lug, and a second further latching contour having a second further latching lug; and
    a second housing part connected to the first housing part via a latching connection, the second housing part including at least one counter-latching contour,
    the at least one first latching lug is arranged spaced apart in a latching direction from the first further latching lug and the second further latching lug,
    wherein in a latched state, the counter-latching contour is latched to the at least one first latching lug or to the first further latching lug and the second further latching lug to hold the first housing part and the second housing part together; and
    wherein the first latching contour, the first further latching contour, and the second further latching contour are arranged in a step-like configuration in the latching direction.

2. The housing according to claim 1, wherein the counter-latching contour is formed as a continuous strip.

3. The housing according to claim 1, wherein the at least one first latching lug is spaced apart from at least one of the first further latching lug and the second further latching lug in the latching direction by approximately 0.10 mm to 0.50 mm.

4. The housing according to claim 1, wherein the first latching contour is arranged in front of the first further latching contour in the latching direction, and the first further latching contour is arranged in front of the second further latching contour in the latching direction.

5. The housing according to claim 1, wherein:
    the first housing part includes the second further latching contour having the second further latching lug, two first further latching contours each having the first further latching lug, and two first latching contours each having the at least one first latching lug,
    the second further latching contour is arranged between the two first further latching contours, the two first further latching contours are arranged between the two first latching contours, and wherein the two first latching contours are arranged in front of the two first further latching contours in the latching direction, and wherein the two first further latching contours are arranged in front of the second further latching contour in the latching direction.

6. The housing according claim 5, wherein at least the first latching contour is formed integrally with the first housing part.

7. The housing according to claim 1, wherein the second housing part includes a groove, and the first housing part includes an associated tongue, the groove and the associated tongue engage one another in a closed latching connection.

8. The housing according to claim 1, wherein the first housing part includes a pressure clamp on a free end of which the first latching contour, the first further latching contour, and the second further latching contour are arranged.

9. The housing according to claim 1, wherein the second housing part includes a through-opening,
    wherein the counter-latching contour projects into the through-opening.

10. The housing according to claim 1, wherein the counter-latching contour is formed integrally with the second housing part.

11. The housing according to claim 1, wherein the counter-latching contour is formed as a lip.

12. The housing according to claim 1, wherein the counter-latching contour is formed as a tongue.

13. The housing according to claim 1, wherein the at least one first latching lug is spaced apart from the at least one further latching lug in the latching direction by approximately 0.10 mm to 0.30 mm.

14. The housing according to claim 1, wherein the at least one first latching lug is spaced apart from the at least one further latching lug in the latching direction by approximately 0.20 mm.

15. The housing according to claim 1, wherein the first latching contour, the first further latching contour, and the second further latching contour are arranged next to one another transversely to the latching direction.

16. A housing, comprising:
    a first housing part including a first latching contour having at least one first latching lug, a first further latching contour having at least one first further latching lug, and a second further latching contour having at least one second further latching lug; and a second housing part connected to the first housing part via a latching connection, the second housing part including at least one counter-latching contour, the counter-latching contour is configured to latch to the at least one first latching lug or to the at least one first further latching lug and the at least one second further latching lug in a latched state;

wherein the at least one first latching lug is arranged spaced apart in a latching direction from the at least one first further latching lug, and the at least one first further latching lug is arranged spaced apart in the latching direction from the at least one second further latching lug, whereby the first latching contour, the first further latching contour, and the second further latching contour are arranged in a step-like configuration in the latching direction.

17. The housing according to claim 16, wherein the first latching contour and the first housing part are formed via plastic injection molding.

18. The housing according to claim 16, wherein the first housing part includes a tongue, and the second housing part includes an associated groove, the tongue and the associated groove engage one another in a closed latching connection.

19. The housing according to claim 16, wherein the first housing part includes a pressure clamp on a free end of which the first latching contour, the first further latching contour, and the second latching contour are arranged.

20. The housing according to claim 16, wherein the first latching contour, the first further latching contour, and the second further latching contour are arranged next to one another transversely to the latching direction.

\* \* \* \* \*